United States Patent [19]

Fenton et al.

[11] 4,405,825

[45] Sep. 20, 1983

[54] POUR POINT REDUCTION OF SYNCRUDE

[75] Inventors: Donald M. Fenton, Anaheim; Dennis D. Delaney, Placentia; Frank W. Stechmeyer, Irvine, all of Calif.

[73] Assignee: Union Oil Company of California, Los Angeles, Calif.

[21] Appl. No.: 316,893

[22] Filed: Oct. 30, 1981

[51] Int. Cl.$^3$ ............................ C10L 1/22; F17D 1/16; F17D 1/17; C10G 29/20
[52] U.S. Cl. ...................................... 585/13; 208/236; 208/289; 208/370; 44/52; 44/72; 137/13
[58] Field of Search ............... 208/370, 236, 289; 585/13; 44/72, 52; 137/13

[56] References Cited

U.S. PATENT DOCUMENTS

| | | | |
|---|---|---|---|
| 1,277,605 | 9/1918 | Knottenbelt | 208/289 |
| 2,473,455 | 6/1949 | Sorg | 44/72 |
| 2,943,049 | 1/1957 | Nahin et al. | 208/254 |
| 3,006,354 | 10/1961 | Sommer et al. | 137/13 |
| 3,025,231 | 3/1962 | Friedman et al. | 208/213 |
| 3,097,158 | 7/1963 | Gleim | 208/289 |
| 3,150,645 | 9/1964 | Mrstik et al. | 44/72 |
| 3,164,546 | 1/1965 | Millikan et al. | 208/236 |
| 3,523,071 | 8/1970 | Knapp et al. | 208/14 |
| 3,532,618 | 10/1970 | Wunderlich et al. | 208/14 |
| 3,617,469 | 11/1971 | Schilinger et al. | 208/11 |
| 3,617,530 | 11/1971 | Rieve et al. | 208/289 |
| 3,778,365 | 12/1973 | Hamner et al. | 208/111 |
| 4,123,232 | 10/1978 | Frost, Jr. | 44/72 |
| 4,166,023 | 8/1979 | Seitzer | 208/14 |
| 4,172,026 | 10/1979 | Jensen | 208/14 |
| 4,181,177 | 1/1980 | Compton | 166/256 |
| 4,240,916 | 12/1980 | Rossi | 252/56 D |

FOREIGN PATENT DOCUMENTS

| | | | |
|---|---|---|---|
| 599447 | 6/1960 | Canada | 137/13 |
| 2511343 | 9/1976 | Fed. Rep. of Germany | 44/72 |
| 56-20091 | 2/1981 | Japan | 44/52 |
| 731219 | 6/1955 | United Kingdom | 44/72 |
| 757086 | 9/1956 | United Kingdom | 44/72 |
| 1027547 | 4/1966 | United Kingdom | 44/76 |
| 1584030 | 2/1978 | U.S.S.R. | 44/72 |
| 755830 | 8/1980 | U.S.S.R. | 44/72 |

*Primary Examiner*—Delbert E. Gantz
*Assistant Examiner*—Helane E. Maull
*Attorney, Agent, or Firm*—Dean Sandford; Gregory F. Wirzbicki; Gerald L. Floyd

[57] ABSTRACT

A composition and method for reducing the pour point of syncrude, such as those from oil shale, tar sands, oil-impregnated diatomite ore, or coal, by adding thereto an effective amount of a nitrogen-containing compound such as ammonia, ammonium hydroxide or a primary, secondary or tertiary water-soluble aliphatic amine or alkanolamine having one or more alkyl groups containing 1 to 4 carbon atoms.

19 Claims, No Drawings

POUR POINT REDUCTION OF SYNCRUDE

BACKGROUND OF THE INVENTION

1. Field of the Invention

This invention relates to a syncrude composition having improved pour point characteristics and to a method for reducing the pour point of syncrudes, such as those from oil shale, tar sands, oil-impregnated diatomite ore, or coal. More particularly, the invention relates to such a composition and method wherein the transportability of the syncrude composition, as through a pipeline or in a carrier vessel is improved.

2. DESCRIPTION OF THE PRIOR ART

There are many sources of syncrudes from which a wide variety of hydrocarbon products can be made. Among these are such syncrudes derived from oil shale, tar sands, oil impregnated diatomite ore, and coal. Broadly, these syncrudes are produced and/or recovered by well known procedures. The syncrude is then further processed, i.e., refined, to yield various hydrocarbon products or mixtures. To carry out this further processing, it is oftentimes necessary first to transport the syncrude a considerable distance from its point of origin to the location where the futher processing is carried out. Oftentimes the syncrude is produced in the form of a viscous liquid having a high pour point which liquid can be transported and handled, if at all, only with great difficulty and use of large quantities of energy.

Tar sands or bituminous sands are sand deposits impregnated with dense, viscous petroleum and also contain a small amount of water. The bitumen can be separated from the sand by a wide variety of methods, for example, anhydrous solvent extraction, cold water separation and hot water separation of mined tar sands as well as fire flood, emulsion-steam drive using a hydrocarbon diluent or detonation of a nuclear device in situ. Similar techniques can be used to recover oil from diatomite ore. Syncrudes can be prepared from coal by solvent extraction, thermal decomposition including pyrolysis or carbonization, or hydrogenation in the presence of a catalyst.

While syncrudes are largely composed of hydrocarbon molecules of various types, they usually also contain heterogeneous compounds of carbon and hydrogen combined with sulfur, oxygen, nitrogen and/or other atoms.

For simplicity, further discussion of the method will be centered on the handling of syncrude produced from oil shale, even though the same or similar techniques can also be applied to syncrude derived from tar sand, oil-impregnated diatomite ore, or coal. Oil shales contain an organic portion which is a mixture of complex chemical compounds referred to as "kerogen" and mineral matter. Destructive pyrolysis, or retorting of crushed shale, carried out either above ground or in situ, yields shale oil. Retorting involves the crushing and heating of large quantities of raw shale and the cooling and discharging of almost equally large quantities of spent shale. Ideally a large percentage of the organic portion converts to a liquid, some converts to light gases and the remainder stays as a carbon-rich residue on the mineral matrix. Shale oils produced by conventional retorting processes generally have pour points in the range of 65° to 85° F. Shale oil retorts, for economic reasons, are usually located near the source of the shale, i.e., often in remote areas, such as Colorado. Since the temperature in these areas is frequently below freezing, high pour point shale oil cannot be handled at these low temperatures unless measures are taken to prevent the oil from being cooled below its pour point and setting up. Since it may be desirable to transport the syncrude, i.e., shale oil by pipeline or tank car from the retorting site to a location where it may be more conveniently further processed, it is especially important to be able to keep the shale oil from solidifying while it is being transported.

A wide variety of compositions and methods employing a number of different treating agents are known for reducing the pour point of shale oil, for example, U.S. Pat. Nos. 3,523,071 to Knapp et al., 3,532,618 to Wunderlich et al., 3,617,469 to Schilinger et al., 4,240,916 to Rossi, 4,166,023 to Seitzer, 4,172,026 to Jensen and 4,181,177 to Compton.

Likewise, it is known to employ ammonia or ammonium hydroxide to prepare additives to be used in treating hydrocarbons such as shale oil, coal tar oil and the like to remove therefrom nitrogen and other materials. In these processes the hydrocarbons are not directly contacted by either ammonia or ammonium hydroxide.

U.S. Pat. No. 2,943,049 to Nahin et al. describes a method for removing nitrogen bases from hydrocarbons such as crude oil, coal tar oil or shale oil wherein the hydrocarbons are contacted with a synthetic cation exchange resin, such as hydrogen bentonite to form a stable nitrogen-containing solid product which can be physically separated from the hydrocarbons. In preparing the hydrogen bentonite, naturally occurring bentonite is contacted first with a synthetic cationic exchange resin previously treated with ammonium chloride, next with a synthetic anionic exchange resin previously treated with a strong hydroxide, such as sodium hydroxide, and finally with a synthetic cationic exchange resin previously treated with a strong acid. In the treatment with the anionic exchange resin, a dilute solution of ammonium hydroxide forms which is subsequently converted to water by contact with the acid-treated cationic exchange resin.

U.S. Pat. No. 3,778,365 to Hamner et al. discloses a process of subjecting heavy hydrocarbon oils containing appreciable quantities of nitrogen, such as crude oil and shale oil, to catalytic hydrocracking and hydrodenitrogenation in the presence of hydrogen and a catalyst prepared by a method involving ammonia activation of a catalyst composite, such as a mixture of non-noble metals deposited on a suitable cracking base, for example, a zeolite. The ammonia activation can be carried out with gaseous ammonia or an ammonia precursor, such as an aliphatic or aromatic amine or a nitrile.

U.S. Pat. No. 3,025,231 to Friedman et al. shows a method for removing organic matter, sulfur and metals from crude shale oil by hydrogenation in the presence of an activated carbon catalyst. As part of the preparation of the catalyst, it is treated with an aqueous solution of concentrated ammonium hydroxide.

While each of the aforementioned compositions and methods has met with some success in particular applications, the need exists for a further improved composition and method for lowering the pour point of syncrudes.

Accordingly, a principal object of this invention is to provide a composition and method for treating syncrudes such as those derived from oil shale, tar sands, oil-impregnated diatomite ore, coal and the like, to reduce the pour point of such syncrudes.

A further object of this invention is to provide such a composition and method wherein the pour point is lowered sufficiently so that the syncrude is in the liquid form at ambient temperature.

A still further object of this invention is to provide such a composition and method wherein the transportability of the syncrude through a pipeline or other conduit is improved.

Yet another object of this invention is to provide such a composition and method wherein the initial wax crystallization temperature of the syncrude is lowered.

Other objects, advantages and features of this invention will become apparent to those skilled in the art from the following description and appended claims.

SUMMARY OF THE INVENTION

Briefly, this invention provides a syncrude composition having improved pour point characteristics and a method for lowering the pour point of such syncrude derived from oil shale, tar sands, oil-impregnated diatomite ore or coal by admixing therewith an effective pour point depressant amount of a nitrogen-containing compound selected from the group consisting of ammonia, ammonium hydroxide, and the primary, secondary or tertiary water-soluble aliphatic amines or alkanolamines having one or more alkyl groups containing 1 to 4 carbon atoms. The said nitrogen-containing derivative is generally used in an amount of about 0.058 to 2.9 parts by weight per 100 parts by weight syncrude, preferably about 0.12 to 0.87 parts by weight per 100 parts by weight syncrude.

DETAILED DESCRIPTION OF THE INVENTION

Syncrude can be derived from certain solid or semi-solid materials, such as oil shale, tar sands, oil-impregnated diatomite ore and coal. These materials are either treated in situ or mined and then treated to separate them into a syncrude and a solid waste product. The source of these materials can be in a remote area. In an effort to reduce shipping costs when handling mined material, this separation is often carried out at or near the point at which the materials are removed from the earth. Thus, it is frequently necessary to transport syncrude produced from such sources a considerable distance to a location where they are further processed. Since the quantity of materials handled is large, it is convenient if the syncrudes are liquid and can be transported through a pipeline. However, the syncrudes derived from the above-described sources are often liquids having a pour point that is above ambient temperature. That is, they are not sufficiently flowable so that they can be transported through a pipeline.

It has been found that the pour point of such syncrudes may be significantly reduced by admixing therewith an effective pour point depressant amount of a water-soluble nitrogen-containing compound which has an alkaline pH in aqueous solution such as ammonia, ammonium hydroxide, a primary, secondary or tertiary water-soluble aliphatic amine or alkanolamine having one or more alkyl groups containing 1 to 4 carbon atoms. Generally such nitrogen-containing compound is used in an amount of about 0.058 to 2.9 parts by weight per 100 parts by weight syncrude preferably about 0.12 to 0.87 parts by weight per 100 parts by weight syncrude.

While the reasons that the nitrogen-containing compounds of this invention are effective in lowering the pour point of the syncrude are not completely understood, it is believed that one of the reasons for a relatively high pour point of the syncrude in their natural form is the presence therein of various acid groups which are hydrogen bonding. The nitrogen-containing compounds appear to neutralize these acids without contaminating the feedstocks with alkali metal ions which can have an adverse effect on subsequent refining processes to which the syncrudes are subjected.

The amount of nitrogen-containing compound required is that amount sufficient to depress the pour point of the syncrude so that it flows or flows more easily at ambient temperatures. The amount will vary of course depending on the composition of each particular syncrude. The amount will vary, at least in part, depending on the nature and amount of acid groups present in the syncrude. In general, it has been found that the presence of about 0.058 to 2.9 parts by weight nitrogen-containing compound per 100 parts by weight syncrude is effective in depressing the pour point of the syncrude. Use of less than about 0.058 part by weight nitrogen-containing compound has negligible effect on the pour point of most syncrudes.

While the use of more than about 2.9 parts by weight nitrogen-containing compound per 100 parts by weight syncrude provides a low pour point, there is no particular advantage in using more than about this amount. It is preferred to use about 0.12 to 0.87 parts by weight nitrogen-containing compound per 100 parts by weight syncrude. Concentrations within this range give a desirably lower pour point than either lower or higher concentrations. The slightly higher pour points of admixtures containing higher concentrations of nitrogen-containing compound might be due to the formation of an emulsion in the presence of treating agent in excess of that amount required to neutralize the acid groups present in the syncrude.

The nitrogen-containing compound can be admixed with the syncrude to produce the composition of this invention in any convenient manner without employing specialized mixing equipment. Since the nitrogen-containing compound is used in a relatively small proportion, it is generally more convenient to add it to the syncrude with agitation to achieve mixing. The mixing can be carried out batchwise, as in mixing tanks, or continuously, as by passing the syncrude through a conduit while blending in the required amount of nitrogen-containing compound, as through an injection tubing in communication with the interior of the conduit. One convenient method of operation is to add the nitrogen-containing compound to a heated body of syncrude, such as a syncrude that has just been extracted from a solid matrix by a process involving the use of heat and has not yet cooled to ambient temperature.

Preferably ammonia is used in the form of anhydrous ammonia or concentrated aqua ammonia which is also known as ammonium hydroxide. While introduction of a limited quantity of water into the system can be tolerated, it is preferred to use concentrated aqueous solutions of ammonia.

The 1 to 4 carbon atom primary aliphatic amines operable in the method of this invention include methylamine, ethylamine, n-propyl-amine, isopropylamine, allylamine, n-butyl amine and isobutylamine. The operable secondary aliphatic amines include dimethylamine, diethylamine, dipropylamine, diisopropyl-amine, diallylamine, dibutylamine, diisobutylamine, sec-butylamine and ethyl-n-butyl-amine. Operable tertiary amines include trimethylamine, triethylamine, tripropylamine, triallylamine, tributylamine, triisobutylamine, tert-butylamine and dimethylbutylamine.

Suitable alkanolamines include monoethanolamine, diethanolamine, triethanolamine, monoisopropanolamine, diisopropanolamine, triisopropanolamine, mono-sec-butanolamine, di-sec-butanolamine, tri-sec-butanolamine, dimethylethanolamine, diethanolamine, aminoethylethanolamine, methylethanolamine, butylethanolamine, and n-acetylethanolamine.

The invention is further illustrated by the following examples which are illustrative of various aspects of the invention and are not intended as limiting the scope of the invention as defined by the appended claims.

EXAMPLES 1 to 18

A series of laboratory tests are made to demonstrate the effect on the pour point of shale oil by the addition thereto of various nitrogen-containing compounds. In each test a 100 gram sample of a syncrude, comprising a retorted, deashed and dearsenated sample of shale oil from the Green River oil shale of Colorado, is placed in a suitable container, the designated amount of a nitrogen-containing compound stirred in, and the pour point determined according to the procedures of ANSI/ASTM D97-66 (Reapproved 1978), as set forth in the 1980 annual Book of ASTM Standards: Part 23, pages 82 to 85. The results of these tests are given in the following Table.

TABLE

Pour Point of Syncrude Derived From Shale Oil Admixed With Nitrogen-Containing Compounds

| Example Number | Amount Nitrogen-Containing Material (Parts/100 Parts By Weight) | | Pour Point* (°F.) |
|---|---|---|---|
| 1 | | none | 70 |
| 2 | 0.058 | ammonium hydroxide** | 65 |
| 3 | 0.097 | " | 50 |
| 4 | 0.12 | " | 35 |
| 5 | 0.14 | " | 35 |
| 6 | 0.17 | " | 35 |
| 7 | 0.23 | " | 15 |
| 8 | 0.29 | " | 20 |
| 9 | 0.58 | " | 15 |
| 10 | 0.87 | " | 27 |
| 11 | 1.2 | " | 40 |
| 12 | 1.7 | " | 40 |
| 13 | 2.3 | " | 35 |
| 14 | 2.9 | " | 25 |
| 15 | 0.2 | ethylenediamine | 30 |
| 16 | 0.2 | ethanolamine | 45 |
| 17 | 0.4 | ethanolamine | 45 |
| 18 | 0.6 | ethanolamine | 45 |

*ANSI/ASTM D97-66 (Reapproved 1978).
**added as a 58 percent by weight aqueous solution of ammonium hydroxide.

As shown in the above Table, the pour point of the syncrude begins to decrease with the addition of as little as 0.058 part by weight ammonium hydroxide per 100 parts by weight feedstock. The pour point continues to decrease until 0.23 to 0.58 parts ammonium hydroxide is used in the admixture. The pour point then begins to increase until 1.2 to 1.7 parts ammonium hydroxide is used. Additions of increasing amounts of ammonium hydroxide results in a further reduction of the pour point. Ethylenediamine and ethanolamine also lower the pour point.

EXAMPLE 19

Raw shale oil is to be transported through a 17 mile long 6 inch diameter pipeline at a rate of 10,000 barrels per day. The buried insulated pipeline is expected to cool to mid-winter temperatures approaching 35° F. The raw shale oil which has a pour point of 65° F. enters the pipeline at 140° F. Under pipeline startup conditions, calculations show that the shale oil will cool to 40° F. before reaching the far end of the pipeline. To assure that the shale oil will not reach its pour point, a proportioning pump is used to inject a 58 percent by weight aqueous solution of ammonium hydroxide into the pipeline feed at a rate of 0.5 percent by volume. Treatment of the raw shale oil in this manner reduces its pour point to about 20° F., thereby providing a safe margin for transporting the shale oil above its pour point.

While particular embodiments of the invention have been described, it will be understood, of course, that the invention is not limited thereto since many modifications can be made and it is intended to include within the invention such modifications as are within the scope of the claims.

The invention having thus been described, we claim:

1. A syncrude composition having improved pour point characteristics consisting essentially of a syncrude derived from oil shale, tar sands, oil-impregnated diatomite ore or coal and an effective pour point depressant amount of a water-soluble nitrogen-containing compound which has an alkaline pH in aqueous solution selected from the group consisting of ammonia, ammonium hydroxide, and primary, secondary and tertiary aliphatic amines and alkanolamines having one or more alkyl groups containing 1 to 4 carbon atoms.

2. The composition defined in claim 1 wherein the nitrogen-containing compound is present in an amount of about 0.058 to 2.9 parts by weight per 100 parts by weight of syncrude.

3. The composition defined in claim 1 wherein the nitrogen-containing compound is present in an amount of about 0.12 to 0.87 parts by weight per 100 parts by weight of syncrude.

4. The composition defined in claim 1 wherein the nitrogen-containing compound is concentrated ammonium hydroxide.

5. A syncrude composition having a relatively low pour point consisting essentially of a syncrude derived from oil shale containing an effective pour point depressant amount of a water-soluble nitrogen-containing compound which has an alkaline pH in aqueous solution selected from the group consisting of ammonia, ammonium hydroxide, and primary, secondary and tertiary aliphatic amines and alkanolamines having one or more alkyl groups containing 1 to 4 carbon atoms.

6. The composition defined in claim 5 wherein the nitrogen-containing compound is present in an amount of about 0.058 to 2.9 parts by weight per 100 parts by weight of syncrude.

7. The composition defined in claim 5 wherein the nitrogen-containing compound is present in an amount of about 0.12 to 0.87 parts by weight per 100 parts by weight of syncrude.

8. The composition defined in claim 5 wherein the nitrogen-containing compound is concentrated ammonium hydroxide.

9. A syncrude composition having improved pipeline transportability consisting essentially of an admixture of shale oil and about 0.058 to 2.9 parts by weight of a water-soluble nitrogen-containing compound which has an alkaline pH in aqueous solution selected from the group consisting of ammonia, ammonium hydroxide, and primary, secondary and tertiary aliphatic amines and alkanolamines having one or more alkyl groups containing 1 to 4 carbon atoms per 100 parts by weight of said shale oil.

10. The composition defined in claim 9 wherein the nitrogen-containing compound is present in an amount of about 0.12 to 0.87 parts by weight per 100 parts by weight of syncrude.

11. The composition defined in claim 9 wherein the nitrogen-containing compound is concentrated ammonium hydroxide.

12. A method for reducing the pour point of a syncrude derived from oil shale, tar sands, oil-impregnated diatomite ore or coal by a process consisting essentially of admixing therewith a pour point depressant amount of a water-soluble nitrogen-containing compound which has an alkaline pH in aqueous solution selected from the group consisting of ammonia, ammonium hydroxide, and primary, secondary and tertiary aliphatic amines and alkanolamines having one or more alkyl groups containing 1 to 4 carbon atoms.

13. The method defined in claim 12 wherein the nitrogen-containing compound is present in an amount of about 0.058 to 2.9 parts by weight per 100 parts by weight of syncrude.

14. The method defined in claim 12 wherein the nitrogen-containing compound is present in an amount of about 0.12 to 0.87 parts by weight per 100 parts by weight of syncrude.

15. The composition defined in claim 12 wherein the nitrogen-containing compound is concentrated ammonium hydroxide.

16. A method for improving the transportability via a pipeline of a syncrude derived from oil shale, tar sands, oil-impregnated diatomite ore or coal which syncrude has a pour point above ambient temperature consisting essentially of:
(a) admixing with the said syncrude about 0.058 to 2.9 parts by weight per 100 parts by weight of syncrude of a water-soluble nitrogen-containing compound which has an alkaline pH in aqueous solution selected from the group consisting of ammonia, ammonium hydroxide, and primary, secondary and tertiary aliphatic amines and alkanolamine having one or more alkyl groups containing 1 to 4 carbon atoms, to produce an admixture having a pour point below ambient temperature, and
(b) passing the resulting admixture through a pipeline.

17. The method defined in claim 16 wherein the nitrogen-containing compound is present in an amount of about 0.12 to 0.87 parts by weight per 100 parts by weight of syncrude.

18. The composition defined in claim 16 wherein the nitrogen-containing compound is concentrated ammonium hydroxide.

19. The method defined in claim 16 wherein the admixing of the syncrude and the water-soluble nitrogen-containing compound, and the passing of the resulting admixture through a pipeline is carried out without heating the admixture.

* * * * *